COMBINATION ADJUSTER AND RESET MECHANISM

Original Filed March 21, 1956 2 Sheets-Sheet 1

INVENTORS
JAMES A. TANKERSLEY
PAUL A. DRISCOLL
BY John A. Young
ATTORNEY

COMBINATION ADJUSTER AND RESET MECHANISM

Original Filed March 21, 1956 2 Sheets-Sheet 2

INVENTORS
JAMES A. TANKERSLEY
PAUL A. DRISCOLL
BY John A. Young
ATTORNEY

United States Patent Office

Re. 26,078
Reissued Sept. 20, 1966

26,078
COMBINATION ADJUSTER AND RESET MECHANISM

James A. Tankersley and Paul A. Driscoll, South Bend, Ind.; said Tankersley assignor to The Bendix Corporation, a corporation of Delaware Original No. 3,095,064, dated June 25, 1963, Ser. No. 572,855, Mar. 21, 1956. Application for reissue June 26, 1964, Ser. No. 390,254
14 Claims. (Cl. 188—72)

Matter enclosed in heavy brackets [ ] appears in the original patent but forms no part of this reissue specification; matter printed in italics indicates the additions made by reissue.

This invention relates to a device which automatically adjusts a disk type brake and also resets the brake to a determined clearance if the brake clearance is lost owing to "overadjustment" which would otherwise cause dragging of the brake.

It often happens that an automatic adjuster overadjusts the brake so that the brake clearances are reduced. When this occurs, the brakes can become locked or "set" in applied position and if the vehicle is moving with the brakes in this condition, there will result considerable drag and overheating of the brake. One of the reasons for overadjustment in brakes is that the adjuster mechanism operates during a brake application while the brake parts are in a temporarily existing state of thermal and mechanical distortion. The adjuster functions with the brake parts in this condition of distortion and thus when the brakes are released, and the brake parts return to their original shape, then the adjustment operation has produced an inaccurate clearance. Because of the tendency for "overadjustment," I have found it desirable to make provision for resetting the brakes following a brake application, in order to re-establish a brake clearance.

This resetting operation will take place by merely pushing on the brake pedal. Once the adjuster has reset the brake, this will relieve any dragging condition or locked condition of the brake.

One of the difficulties of combining a "reset" function with the automatic adjuster, is a partial loss of the effective piston area which applies the brake. It is an object of this invention to provide a construction which will operate in conjunction with a fluid motor, to both adjust and reset the brake, and yet enable full utilization of the piston area for applying the brake.

Another object of the invention is to obtain an adjuster and reset device which is of reduced length so that it can be readily fitted in the carrier plate of a brake. It is well known that space limitations are highly important in certain types of brakes (for example, aircraft brakes) and it will be therefore appreciated that this feature is of considerable importance.

Other features and objects of the invention will become apparent as the description develops, with reference to the accompanying drawings, wherein a plurality of embodiments of the invention are described by way of example.

Figure 1:
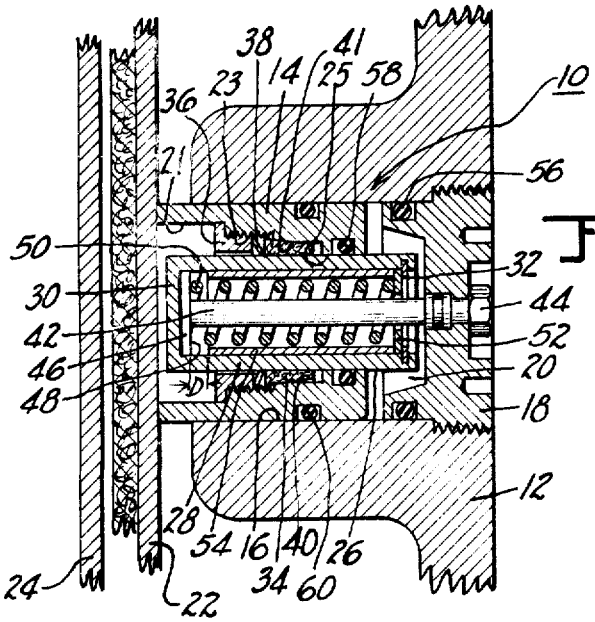
FIGURE 1 shows the adjuster and reset device in a fluid motor actuator for a brake, parts of the brake being shown in fragmentary section.

For a typical disk type brake with which the present invention may be used, see application Serial No. 144,943, filed February 18, 1950, now abandoned in favor of continuation application Serial No. 577,612, now U.S. Patent 2,885,033.

Referring first to the embodiment shown in FIGURE 1, the device will be described in conjunction with a disk type brake in which relatively rotatable and nonrotatable members are clamped together for frictional engagement. It will be understood that the device may be used with other types of brakes and may also be used for clutches or other wearable devices in which it is desired to vary the relative position of members responsively to wear.

A fluid motor 10 is mounted in a carrier plate 12 which serves as a housing for the fluid motor. A number of fluid motors [are] *is* spaced circumferentially around the carrier. Not all of the fluid motors need be equipped with the invention. For purposes of explanation, the selected fluid motor is provided with the invention. The fluid motor includes a pressure responsive piston 14 which is slidable in cylinder bore 16 and a sealing plug 18 that is threadedly received in the carrier 12. Between the piston and the plug is a fluid chamber 20 wherein pressure is developed to displace the piston 14 toward the left and thus actuate the brake. The piston 14 is engageable with a pressure plate 22 which is circumferentially fixed. The pressure plate 22 is splined to a fixed part of the vehicle so that rotative movement is prevented, but axial movement is permitted. The piston 14 forces the pressure plate 22 leftwardly, into engagement with a rotor 24 which turns either with the wheel or some other rotatable part of the vehicle. Additional plates, alternately rotors and stators, may be stacked adjacently to the pressure plate in the usual manner.

Piston 14 has a number of stepped bores 21, 23 and 25 which accommodate the automatic adjuster and reset device designated generally by reference numeral 26.

The adjuster and reset device includes a piston-positioning sleeve 28 which is closed at one end 30 and has a snap ring 32 in the opposite end thereof. The sleeve is fixed to the piston by means of a friction material ring 34 which grips the outer surface of the sleeve. The friction created between the ring 34 and the outer surface of the sleeve is determined by a gripping force obtained in whatever degree desired, by a threaded nut 36 which bears against one side of the friction ring through a loading spring 38. It will be noted that side 40 of the ring and the mating surface 41 of the piston are inclined so that as the friction ring 34 is forced toward the right there is a wedging action which forces the ring more tightly against the outer surface of the sleeve 28. The gripping force between the friction ring 34 and the sleeve 28 is thus controlled by turning down or backing off the nut 36.

An elongated stem 42 is fastened at one end 44 to the plug 18 and has a boss 46 at the other end thereof. The boss 46 has an annular shoulder 48. Helical spring 50 is compressed within the sleeve 28 between the shoulder 48 and washer 52 which is held in place by the snap ring 32. Also within the sleeve, is a force-transmitting tubular member 54 which bears against the washer 52 and is movable into and out of engagement with the shoulder 48 on the stem through the distance "D." It will be seen later in the description that this distance "D" between the end of the tubular member 54 and the shoulder 48 is the established clearance for the brake.

The chamber 20 is sealed by means of a number of O-ring seals 56, 58 and 60. The fluid pressure developed in chamber 20 is communicated to the interior of the sleeve 28, so that none of the effective area of the piston is diminished by the sleeve 28.

The O-ring seal 58 seals the exterior surface of the sleeve so that friction ring 34 and the surface whereon it slides is dry and remains free of any lubricating effect from the hydraulic fluid.

In operation, fluid pressure is developed within the chamber 20 and the interior of the sleeve 28, thus moving the piston 14 toward the left and into engagement with the pressure plate 22. The pressure plate 22 is forced into frictional engagement with the adjacent relatively rotatable rotor 24 and the stack of interleaved rotors and stators thus are frictionally compressed. This frictional engagement of the brake parts retards the vehicle.

As the piston 14 moves leftwardly, the sleeve 28 is also moved therewith, since they are frictionally held together by the ring 34. The sleeve 28 continues to move with the piston until the tubular member 54, moving through the distance "D," engages the shoulder 48 and thereafter the sleeve 28 is held against further leftward movement.

If the brake has worn, so that the clearance of the brake is in excess of the distance "D," the piston 14 will continue to move relatively to the sleeve 28 against the frictional resistance of the ring 34. This movement of the piston, relatively to the sleeve, pushes the friction ring 34 along the length of the sleeve 28 to a new position thereon. While the sleeve 28 moves with the piston 14, the spring 50 is being compressed so that during brake application a part of the applying force is stored within the device to serve as a retracting force on the piston when the applying pressure is released.

When the applying pressure in the chamber 20 is released, the spring 50 acting through the washer 52, will push the sleeve 28 toward the right until it re-engages the boss 46. This retractile movement of the sleeve 28 is equal to the distance "D." The friction ring connection 34 with the piston 14 will also return the piston 14 through a like distance. It will be noted that even though the piston 14 might have been displaced along the length of the sleeve 28 during a brake application, yet the extent of its retraction is equal to the distance "D," so that brake clearance remains constant.

Assume next that the brake has "overadjusted." In other words, there is less than the clearance "D" within the brake, and the brakes are partially or fully applied, even though the brake applying pressure is relieved. The reset operation of the device will now be described:

To relieve this brake dragging condition the brake pedal is depressed. When the brake pedal is depressed, pressure is developed in chamber 20. Since the piston 14 is already in engagement with the pressure plate 22, it is prevented from moving leftwardly. The pressure in the chamber does, however, cause a movement of the sleeve 28 relatively to the piston and in a leftwardly direction through the distance "D" until tubular member 54 engages the shoulder 48 of boss 46. The spring 50 is compressed by this movement of the sleeve through the distance "D." It will also be noted that sleeve 28 is moved against the resistance of the friction ring 34. When the pressure in chamber 20 is relieved, the spring 50 forces the sleeve 28 toward the right through the distance "D," also returning the piston 14 through a like distance since the piston and sleeve are held together through the friction ring 34. By thus initially moving the sleeve 28 in a leftward direction relatively to the fixed piston, it is possible to retract the piston 14 and reset the piston to its original clearance.

Figure 2:
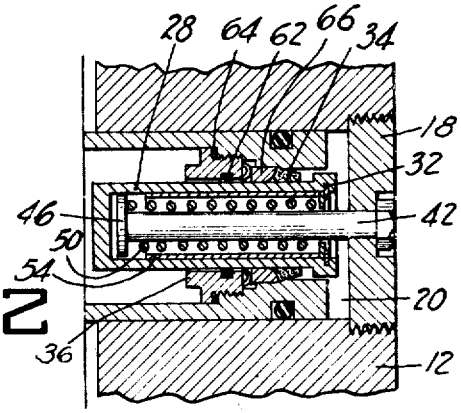
FIGURE 2 is a modification of the device shown in FIGURE 1, showing a different location for the fluid sealing members.

Referring next to the modification in FIGURE 2, it will be shown that by relocating the O-ring seals 58 and 60, it is possible to immerse the friction ring 34 in hydraulic fluid in order to obtain a more stable coefficient of friction between the ring 34 and the piston-positioning sleeve 28. In this construction the O-ring seals 62 and 64 are mounted in the clamp 36 to expose the friction ring 34 to hydraulic fluid. The hydraulic fluid permeates the friction ring and coats the engageable surface of the sleeve 28. The hydraulic fluid acts as a lubricant which produces a more constant coefficient of friction between the ring 34 and the engageable surface of the sleeve 28. Because of greater consistency in the coefficient of friction, the operation of the reset and adjusting device is less subject to variations. It will be noted that there is a collar 66 between the clamping nut 36 and friction ring 34. The collar 66 exerts a compressive force on the friction ring 34.

The operation of the device shown in FIGURE 2 is the same as the device shown in FIGURE 1.

Figure 3:
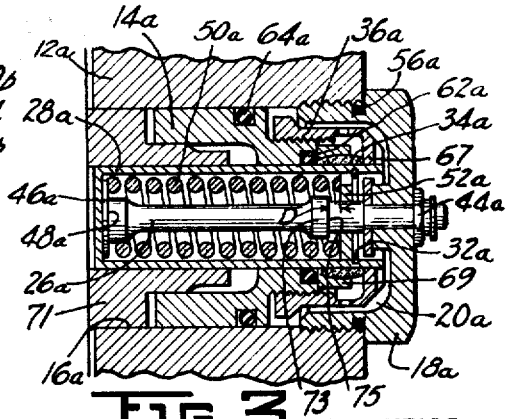

Referring next to the embodiment shown in FIGURE 3, parts of the device corresponding to those previously described will receive the same reference numeral and the subscript "a." Piston 14a is slidably mounted in cylinder bore 16a which is formed in carrier 12a. The cylinder bore is sealed at one end by a threaded plug 18a.

Between the piston 14a and plug 18a there is formed a fluid tight chamber 20a which communicates through a passage (not shown) in the carrier 12a with some suitable pressure source.

A loading nut 36a is screwed onto a threaded portion of the piston. The loading nut is cup-shaped and the turned back portion 67 thereof is engageable with friction ring 34a. Surrounding the friction ring is a split collar 69 with the inner periphery thereof tapered to bias the friction ring 34a against the outer surface of tubular member 28a. The friction ring grips the tubular member to frictionally hold the piston 14a and tubular member 28a together.

At the end of the piston 14a and carried thereby, is a shield of insulating material 71 which serves as a heat barrier for the hydraulic fluid so that the heat developed by the brakes does not produce vaporization of the hydraulic fluid. Within the tubular member 28a there is a washer 52a which is held in place by a snap ring 32a. A helical spring 50a is compressed between shoulder 48a on boss 46a of stem 26a and washer 52a.

The steam 26a is secured to the plug 18a by a nut 44a. The spring 50a holds the end of the sleeve 28a against boss 46a of the steam 26a. A second boss 73 having a shoulder 75 is contacted by washer 52a to hold the sleeve 28a against movement with the piston 14a. The clearance between the washer 52a and shoulder 75 is equal to the distance "D" which is the clearance maintained in the brake regardless of wear.

When the chamber 20a is pressurized, the piston 14a is displaced leftwardly, referring to FIGURE 3, to take up brake clearances and appply the brake. As the piston 14a moves, the sleeve 28a is carried therewith through the friction ring 34a until the clearance "D" is taken up whereupon washer 52a engages shoulder 75 of boss 73 on the stem to hold sleeve 28a against further movement. If brake wear necessitates further piston travel, then the piston continues to move in a protractile direction with the sleeve 28a fixed and the friction ring 34a is thus displaced leftwardly on the sleeve 28a by portion 67 of nut 36a.

When the applying pressure in chamber 20a is relieved, the spring 50a forces the sleeve 28a toward the right, through the distance "D" until it re-engages boss 46a. This movement also carries the piston 14a therewith, through a like distance since the sleeve and piston are held together through the friction ring 34a.

Assume next that the brake is dragging because the clearance "D" is lost owing to "overadjustment." In this case the operator pumps the brake to develop pressure in chamber 20a. The piston 14a is held against movement in a protractile direction since it is already producing brake application. The development pressure does, however, cause the sleeve 28a to move leftwardly relative to the piston 14a, through the distance "D" against the resistance of spring 50a and friction ring 34a. When the pressure in chamber 20a is relieved, the sleeve 28a is retracted through the distance "D" which also carries the piston 14a therewith through the same distance to reestablish the brake clearance.

From the location of O-ring seals 56a, 62a and 64a, it will be noted that the friction ring 34a and engageable surface of the sleeve 28a are immersed in hydraulic fluid to obtain a more constant coefficient of friction therebetween.

Figure 4:
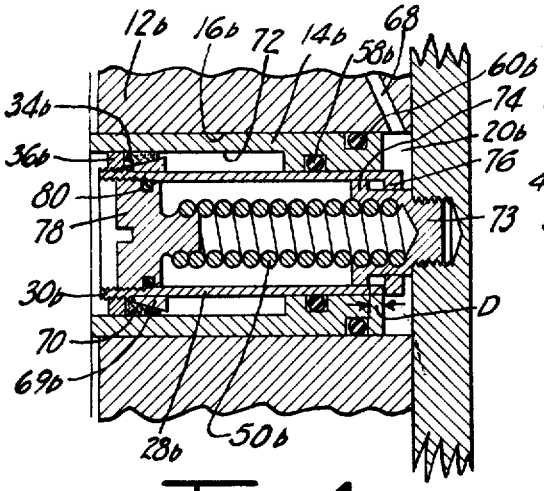
FIGURES 3, 4, 5 and 6 are further embodiments of the invention, each of these figures being detail section views of the device. All parts of the brake in FIGURES 2–6 are removed except the carrier of the brake.

Referring next to the embodiment in FIGURE 4, the piston 14b is slidably mounted in cylinder bore 16b which is formed in carrier 12b. A fluid chamber 20b is formed in the carrier, this chamber 20b being pressurized through communication with a passage 68. A piston-positioning sleeve 28b is mounted within the piston 14b and is carried by the piston. At the one end 30b of the sleeve there is a boss 69b having an inclined surface 70. The extreme end of the sleeve is threaded both interiorly and exteriorly. A clamping nut 36b is received on the outer threaded portion and wedges a friction ring 34b between the boss 30b and the inner bore 72 of the piston. The friction ring 34b creates frictional force between the piston 14b and the sleeve 28b which resists relative movement between these two parts. In this embodiment, the friction ring 34b is held fixed on the piston-positioning sleeve 28b, and when relative movement occurs between the sleeve 28b and the piston 14b, the friction ring 34b slides on surface 72 of the piston.

The stem 42 in the previous embodiments is replaced by a stud 73 which is threadedly fixed in the carrier. The sleeve 28b has a shoulder 76 which is movable through distance "D," into and out of engagement with shoulder 74 of stud 73.

Within the sleeve 28b there is a threaded cap 78 having an O-ring seal 80 which seals the interior of the sleeve, and a tension spring 50b which is fastened at one end to the cap 78 and at the other end to the stud 73.

O-ring seals 58b and 60b prevent leakage of fluid from the chamber 20b through the outer edge of the piston or between the piston 14b and the sleeve 28b. In this embodiment, as well as the others, the combination adjuster and reset device does not diminish the effective area of the piston. The entire area of the piston is available to develop brake-applying force.

In operation, brake-applying pressure is developed in chamber 20b to displace the piston 14b toward the left. Both the piston and the sleeve 28b move leftwardly until the brake clearance "D" is exceeded whereupon shoulder 76 of the sleeve 28b engages shoulder 74 of the stud 73 and further movement of the sleeve 28b is prevented. The piston 14b is free to continue movement against the resistance of friction ring 34b, and movement of the piston continues until the brake is fully applied. Movement of the piston 14b relatively to the sleeve 28b causes the friction ring 34b to slide on the surface 72 and thus adjustably positions the piston toward the left.

While the sleeve 28b moves with the piston 14b through the distance "D," spring 50b is loaded by elongation to produce a tensioning thereof. This tensioning of the spring 50b serves as a retracking force on the piston 14b when the brake applying pressure is relieved. When the brake is released, the spring 50b pulls the sleeve 28b towards the right through the distance "D" and the sleeve pulls the piston 14b toward the right through a like distance, since the two are held together by friction ring 34b. The adjuster retracts the piston by the same distance "D," even though the piston has moved a greater distance on its protractile stroke. The distance of the piston from a full applying position to a release position equals the distance "D" and thus brake clearance remains constant.

Assume next that the brake is overadjusted and the clearance "D" in the brake is lost so that the piston 14b is bearing against the pressure plate to produce a dragging condition in the brakes. The piston can be reset in the following manner by merely pumping the brake pedal.

When pressure is developed in chamber 20b the piston 14b is prevented from movement toward the left, since it is already in engagement with the pressure plate; the applying pressure does, however, cause a protractile movement of the sleeve 28b toward the left relatively to the piston 14b until the shoulder 76 engages shoulder 74 on the stud 73. This movement of the sleeve 28b occurs against the frictional resistance of the friction ring 34b which slides along the surface 72. While the sleeve 28b is moved through the clearance distance "D," the spring 50b is being loaded by tensioning thereof. When the pressure is released, the spring 50b contracts and returns the sleeve 28b through the distance "D," and this movement of the sleeve also retracts the piston 14b through the same amount since the sleeve and piston are held together through friction ring 34b. In this manner, the piston 14b is retracted through the distance "D" and is thus reset to a position providing clearance in the brake.

Figure 5:
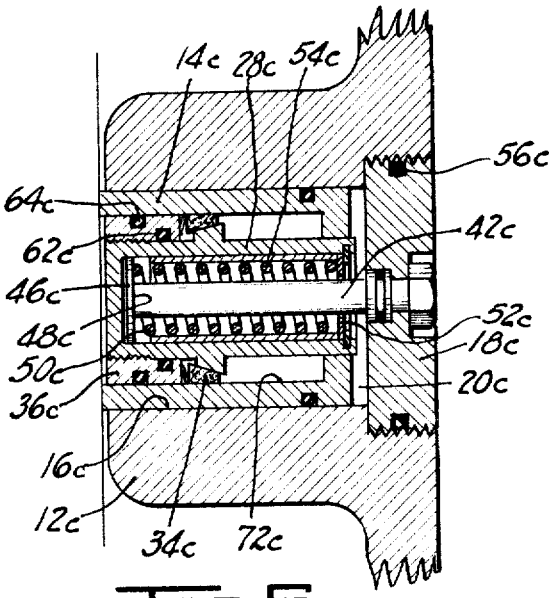

Referring next to the embodiment shown in FIGURE 5, parts of the brake corresponding to those shown in FIGURE 1 have the same reference numeral but also include the subscript "c." This embodiment of the invention is similar to the one shown in FIGURE 1, in that the return spring is compressed during protractile movement of the piston, and is similar to the embodiment shown in FIGURE 3 in that the friction material ring is held fixed on the sleeve and is slidable on a surface of the piston.

The piston 14c is slidable in cylinder bore 16c and is displaced responsively to development of pressure in the chamber 20c. Piston-positioning sleeve 28c is located within and is carried by the piston 14c. The sleeve 28c and piston are held together by a friction ring 34c which is wedged between the two members by a clamping nut 36c.

The fluid in chamber 20c is sealed therein with an O-ring seal 56c and fluid leakage is prevented through the friction device by O-ring seals 62c and 64c which are located in clamping nut 36c. This arrangement of fluid seals is similar to that shown in FIGURE 2. The hydraulic fluid reaches the area around the friction ring 34c; it permeates the ring and covers the slidable surface 72c of the piston. The hydraulic fluid coating has a lubricating effect which makes a more stable and consistent coefficient of friction.

A stem 42c is securely held at one end thereof to plug 18c which is screwed into the carrier 12c, and at the other end of the stem is a boss 46c with a shoulder 48c. Spring 50c is compressed within the sleeve 28c between washer 52c and shoulder 48c. Force-transmitting tubular member 54c is the same as in the embodiment shown in FIGURE 1.

The operation of this device is substantially the same as that in FIGURE 1. The piston is moved leftwardly relatively to the sleeve 28c when the brake clearance is exceeded, and this position is held by means of the friction ring 34c. During a resetting operation, when the brake is pumped, the piston is fixed and the sleeve 28c moves leftwardly relatively to the piston through the established clearance "D" so that when the pressure is relieved, the sleeve is returned through a like distance, also pulling the piston therewith.

Figure 6:
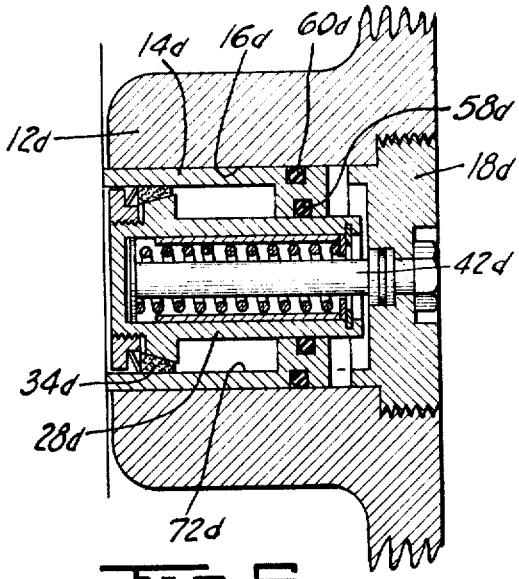

Referring next to the embodiment shown in FIGURE 6, there is a further embodiment of the invention. In this embodiment, as well as the embodiments shown in FIGURES 1, 2, 3 and 5, the device can be removed from the brake with very little difficulty for servicing and replacement purposes. The adjuster and fluid motor are removed as a unit from the outboard side of the brake, so that the brake does not have to be disassembled in order to repair or replace the device.

In this embodiment the threaded plug 18d is screwed into the carrier 12d and has attached thereto one end of the stem 42d. The piston 14d is slidable in bore 16d. The piston-positioning sleeve 28d is mounted in the piston 14d just as in the previous embodiment. A friction ring 34d is wedged between the sleeve and the piston to frictionally hold these two members together. The location of the O-ring seals 58d and 60d prevents access of fluid to the friction ring 34d. The friction ring thus remains dry, as well as the bearing surface 72d within the piston. The adjuster and reset operation of this embodiment is the same as the device shown in FIGURE 4. What characterizes this embodiment and the embodiment of FIGURES 1, 2, 3 and 5 is that the plug 18d can be screwed out of the carrier and removed and will carry with it the piston and all the components of the adjuster and reset device, since the plug 18d is fastened to the piston and sleeve 28d through the stem 42d. This is a very great advantage, since the plug 18d is on the outboard side of the brake and can be reached without disassembling the rotors and stators which are on the opposite side of the carrier plate.

The embodiment in FIGURE 6 differs from the one shown in FIGURE 1 in the location of the O-ring seals, the friction ring and the surface on which the friction ring is slidable during adjustment and resetting of the brake.

Although the invention has been described in conjunction with certain selected embodiments, it will be understood by those skilled in the art that numerous modifications and changes may be made of these examples without departing from the underlying principles of the invention.

We claim:

1. In a brake, the combination of: a fluid motor carrier, a cylinder bore formed in said carrier wherein a fluid pressure is developed to cause actuation of said brake, a piston responsive to said fluid pressure slidably received in said cylinder bore, said piston being centrally apertured to receive a positioning device, said positioning device including a stem threadedly secured at one end to said carrier and having a fixed abutment at the other end thereof, a sleeve member received in the piston aperture, a friction ring encircling said sleeve, a threaded member screwed onto said piston to bear against said friction ring to develop friction which impedes relative movement between said piston and sleeve, a tubular member located within said sleeve and operatively secured at one end thereof to said sleeve and engageable at the other end thereof with the fixed abutment on said stem to prevent further movement of said sleeve, and a spring member which is compressed between the fixed abutment on said stem and a transverse portion of said sleeve, said tubular member being constructed with a length permitting movement of said sleeve together with said piston, said sleeve movement serving to compress said spring which then exerts a retractive force on said piston when said fluid pressure is relieved.

2. In a brake, a fluid motor actuator having a pressure-responsive, reciprocable piston element, a carrier for said fluid motor, an elongated member operatively fixed at one end thereof to said carrier, a first abutment means constructed along the length of said elongated member, reciprocable means limitedly movable with respect to said carrier, a second abutment spaced from said first abutment to permit movement of said reciprocable means between the limits defined by said first and second abutments, friction means joining said piston and reciprocable means whereby the two are moved together, a spring combined with said reciprocable means so that movement of the reciprocable means in a protractile direction loads said spring, and a hydraulic fluid chamber wherein fluid pressure is developed to move either the piston or the reciprocable means in a protractile direction, said spring serving to move the reciprocable means in a retractile direction through the limited movement permitted thereof and also said piston therewith.

3. In a disc brake having a carrier member, a combination adjuster and reset device including a plug threadedly engaged with said carrier member, a fixed member secured at one end to said plug and at the opposite end having a first stop member formed thereon, a second stop member secured to said fixed member intermediate said ends, a pressure-responsive element having an inner bore therein, a positioning member slidably mounted in said bore, a friction member operatively connected to adjacent cooperating surfaces of said pressure-responsive element and said positioning member whereby relative movement between said pressure-responsive element and said positioning member is resisted, a fluid chamber adjacent one end of said bore, means for pressurizing the fluid in said chamber, said pressure-responsive element and said positioning member being responsive to said fluid pressure to cause an application of said disc brake, said positioning member being provided with a flanged portion which engages said second stop member to limit the movement of said positioning member to an established distance when the brake is applied, and resilient means operatively connected between said positioning member and said first stop member and loaded by said positioning member during protractile movement thereof so as to develop a force which when the fluid pressure is released acts to retract said positioning member and said pressure-responsive element through said established distance, said pressure-responsive element being adjustably movable in increments relative to said positioning member in response to said fluid pressure which overcomes the resistance of said friction member subsequent to engagement of said flanged portion with said second stop member whereby compensation is made for wear of the disc brake.

4. A device for adjusting and resetting a fluid pressure-responsive element, said device including a positioning member having means connected to and carried by said pressure-responsive element, said positioning member including means responsive to said fluid pressure, said connected means including yieldable means for resisting relative motion between said positioning member and said pressure-responsive element, a fixed stop member positioned in said pressure-responsive element and extending outside thereof for connection to a stationary element, said positioning member being movable through an established distance into operative engagement with said fixed stop during the protractile stroke of said positioning member and said pressure-responsive element, and resilient means operatively connected to said fixed stop and said positioning member and loaded by said positioning member during protractile movement thereof so as to develop a force which acts to retract said positioning member and said pressure-responsive element through said established distance, said positioning member being movable in a protractile direction relative to said pressure-responsive element in response to said fluid pressure which overcomes the resistance of said yieldable means when said pressure-responsive element is energized to a fixed position at one end of its range of travel.

5. In a brake having a stationary carrier member, a combination adjuster and reset device including a fixed stop member connected to said stationary carrier member, a pressure-responsive element having an inner bore therein, a positioning member slidably mounted in said bore, a friction member operatively connected to adjacent cooperating surfaces of said pressure-responsive element and said positioning member, whereby relative movement between said pressure responsive element and said positioning-member is resisted, a fluid chamber adjacent one end of said bore, means for pressurizing the fluid in said chamber, said pressure-responsive element and said positioning member being responsive to said fluid pressure to cause an application of said brake, said positioning member being provided with a flanged portion which engages said fixed stop member to limit the movement of said positioning member to an established distance when the brake is applied, a spring connected at one end to said positioning member and at the opposite end to said fixed stop member and loaded in tension by said positioning member during protractile movement thereof so as to develop a force which when the fluid pressure is released acts to retract said positioning member and said pressure-responsive element through said established distance said pressure-responsive element being adjustably movable in increments relative to said positioning member in response to said fluid pressure which overcomes the resistance of said friction member subsequent to engagement of said flanged portion with said fixed stop member whereby compensation is made for wear of the brake, said positioning member also being adjustably movable in increments relative to said pressure-responsive element in response to said fluid pressure which overcomes the frictional resistance of said friction member subsequent to an application of the brake by said pressure-responsive element before said fixed stop member is engaged by said flanged portion whereupon said positioning member is actuated in a protractile direction to cause said flanged portion to engage said fixed stop member to thereby re-establish said established distance.

6. In braking mechanism having braking elements mounted for relative movements into and out of engagement, power means for actuating said elements, comprising: a cylinder; a main piston reciprocable in said cylinder; a fixed member extending axially of said main piston; an auxiliary piston within the main piston surrounding the fixed member and being supported for relative axial movement between spaced limits with respect to the fixed member; spring means acting to bias said auxiliary piston towards one limit of its movement; and a friction connection between said main piston and said auxiliary piston normally connecting said pistons for unitary movement, but enabling relative movement thereof when the frictional force of said connection is exceeded.

7. In braking mechanism having braking elements mounted for relative movements into and out of engagement, power means for actuating said elements, comprising: a cylinder; a main piston reciprocable in said cylinder; a fixed member extending axially of said main piston; an auxiliary piston within the main piston surrounding the fixed member and being supported for relative axial movement between spaced limits with respect to the fixed member; spring means acting to bias said auxiliary piston towards one limit of its movement; and a friction connection between said main piston and said auxiliary piston normally connecting said pistons for unitary movement, but enabling relative movement thereof when the frictional force of said connection is exceeded, said friction connection comprising a grip ring carried by said main piston and having engagement with said auxiliary piston; and means carried by said main piston for adjustably regulating the frictional gripping force of said grip ring with respect to said auxiliary piston.

8. In braking mechanism having braking elements mounted for relative movements into and out of engagement, power means for actuating said elements comprising: a cylinder; a main piston reciprocable in said cylinder; a fixed member extending axially of said main piston; an auxiliary piston within the main piston surrounding the fixed member and being supported for relative axial movement between spaced limits with respect to the fixed member; spring means acting to bias said auxiliary piston towards one limit of its movement; and a friction connection between said main piston and said auxiliary piston normally connecting said piston for unitary movement, but enabling relative movement thereof when the frictional force of said connection is exceeded, said friction connection comprising an expansion ring carried by said auxiliary piston and having engagement with said main piston; and means carried by said auxiliary piston for adjustably regulating the frictional force of said expansion ring with respect to said main piston.

9. In braking mechanism having braking elements mounted for relative movements into and out of engagement, power means for actuating said elements, comprising: a cylinder; a main piston reciprocable in said cylinder; a fixed member extending axially of said main piston; an auxiliary piston within the main piston surrounding the fixed member and being supported for relative axial movement between spaced limits with respect to the fixed member; spring means acting to bias said auxiliary piston towards one limit of its movement; and a friction connection between said main piston and said auxiliary piston normally connecting said pistons for unitary movement, but enabling relative movement thereof when the frictional force of said connection is exceeded, said friction connection comprising an expansion ring carried by said auxiliary piston adapted to engage said main piston with a predetermined pressure and frictionally oppose relative movement between the main piston and the auxiliary piston.

*10. In a brake or the like: a cylinder housing having a bore therein; a piston, reciprocably slidable in a forward actuating direction and a rearward retraction direction, located in said bore; said piston having a rear face, an opening in said rear face, and a bore terminating at said opening in said rear face; an element gripping the wall of said piston bore; a member fixedly secured to said housing at a location opposite said piston bore and extending in a forward direction from said housing; said element being slidable relative to said member; a lost motion stop connection between said member and said element when said element is moved forwardly; whereby upon movement of said piston in a forward direction, said piston and element will move as a unit until said element is stopped by said lost motion stop connection and upon further forward movement of said piston, said gripping connection between said element and piston will be overcome and said piston will move forwardly relative to said element and be gripped thereby at a new position thereon; and resilient means operatively connected to said element and said member reacting on said member to provide a retraction force on said element and piston as a unit after actuation of said piston.*

*11. The structure as recited in claim 10 wherein said resilient means comprises a coil spring which is loaded in tension during actuating movement of said piston.*

*12. In a brake or the like: a cylinder housing having a bore therein; a piston, reciprocably slidable in a forward actuating direction and a rearward retraction direction, located in said bore; said piston having a rear face, an opening in said rear face, and a bore terminating at said opening in said rear face; a member fixedly secured to said housing at a location opposite said piston bore and extending in a forward direction from said housing; a piston positioning member slidably mounted on said fixed member and located in said piston bore; an element located in said piston bore and secured to said piston for movement therewith; said element gripping said slidable positioning member; a lost motion stop connection between said slidable positioning member and said fixed member when said slidable positioning member is moved forwardly; whereby upon movement of said piston in a forward direction, said piston, element and slidable positioning member will move as a unit until said slidable positioning member is stopped by said lost motion connection and upon further forward movement of said piston, said gripping connection between said element and slidable member will be overcome and said piston and element will move forwardly relative to said slidable and fixed members to a new gripping position on said slidable member; resilient means operatively connected to said fixed member and said slidable positioning member reacting on said fixed member to provide a retraction force on said positioning member, said element and said piston as a unit after actuation of said piston.*

*13. In a brake or the like: a cylinder housing having a bore therein; a piston, reciprocably slidable in a forward actuating direction and a rearward retraction direction, located in said bore; said piston having a rear face, an opening in said rear face, and a bore terminating at said opening in said rear face; an elongated member fixedly*

*secured to said housing at a location opposite said bore and extending in a forward direction into said piston bore; an elongated piston positioning member surrounding said fixed member, slidably mounted thereon, and located in said piston bore; an element located in said piston bore surrounding said members and secured to said piston for movement therewith; said element gripping said slidable positioning member; a lost motion stop connection between said slidable positioning member and said fixed member when said slidable positioning member is moved forwardly; whereby upon movement of said piston in a forward direction, said piston, element and slidable positioning member will move as a unit until said slidable positioning member is stopped by said lost motion connection and upon further forward movement of said piston, said gripping connection between said element and slidable member will be overcome and said piston and element will move forwardly relative to said slidable and fixed members to a new gripping position on said slidable member; resilient means operatively connected to said fixed member and said slidable positioning member reacting on said fixed member to provide a retraction force on said positioning member, said element and said piston as a unit after actuation of said piston.*

*14. The structure as recited in claim 13 wherein an annular space is provided between said fixed member and*

*said slidable piston positioning member; said piston positioning member having an annular portion extending transverse to said fixed member; said lost motion connection including abutment means at the forward end of said fixed member; said resilient means comprising a coil spring surrounding said fixed member and being located in said annular space; said coil spring having one end engaging said transverse portion and the other end engaging said abutment.*

References Cited by the Examiner

The following references, cited by the Examiner, are of record in the patented file of this patent or the original patent.

UNITED STATES PATENTS

| | | | |
|---|---|---|---|
| 2,392,970 | 1/1946 | Bricker. | |
| 2,496,699 | 2/1950 | Clark. | |
| 2,568,858 | 9/1951 | Kovac. | |
| 2,644,549 | 7/1953 | Cagle. | |
| 2,746,254 | 5/1956 | Lucien. | |
| 3,085,663 | 4/1963 | Jakeways | 188—196 |

DUANE A. REGER, *Primary Examiner.*

EUGENE BOTZ, MILTON BUCHLER, *Examiners.*